Patented June 28, 1938

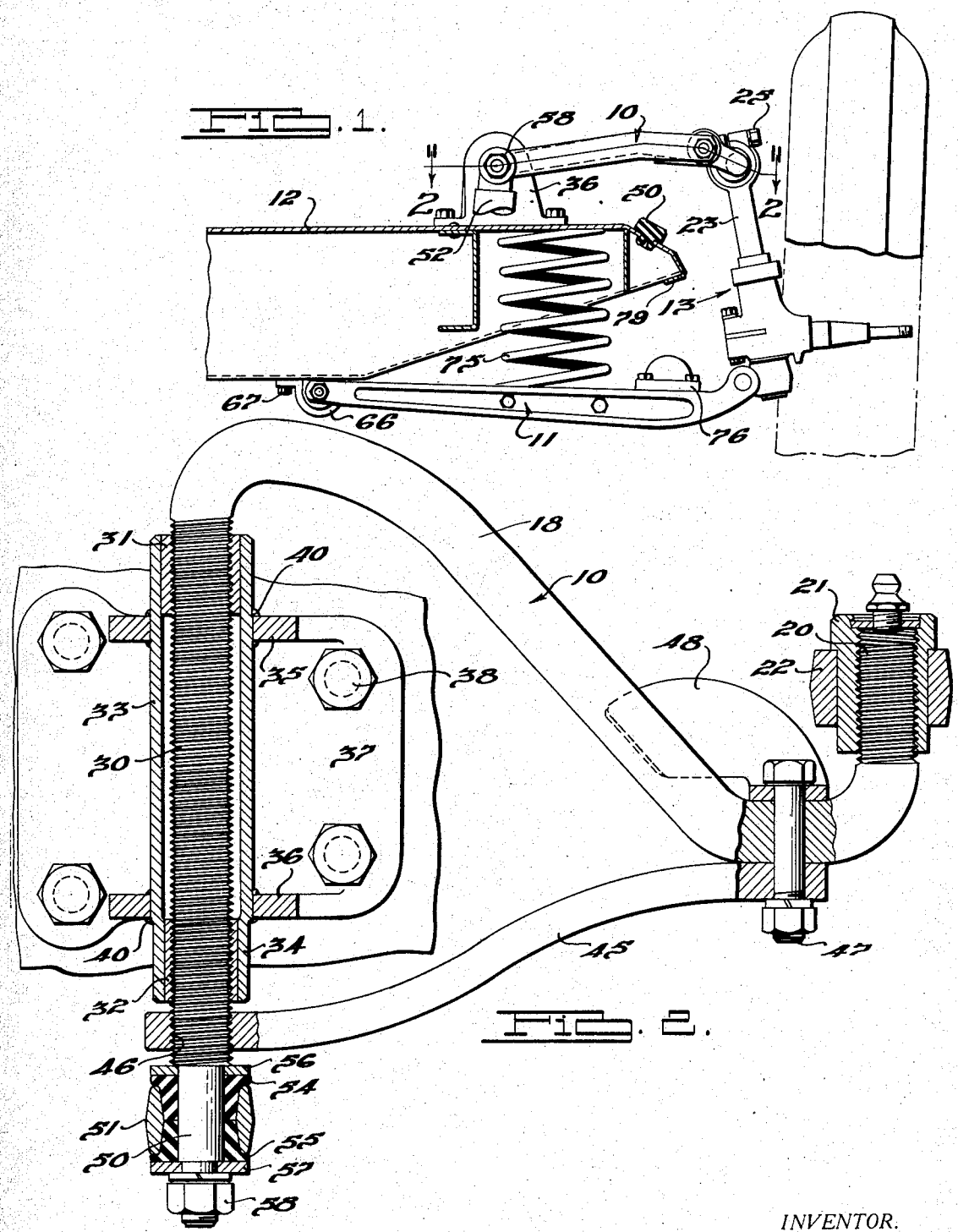

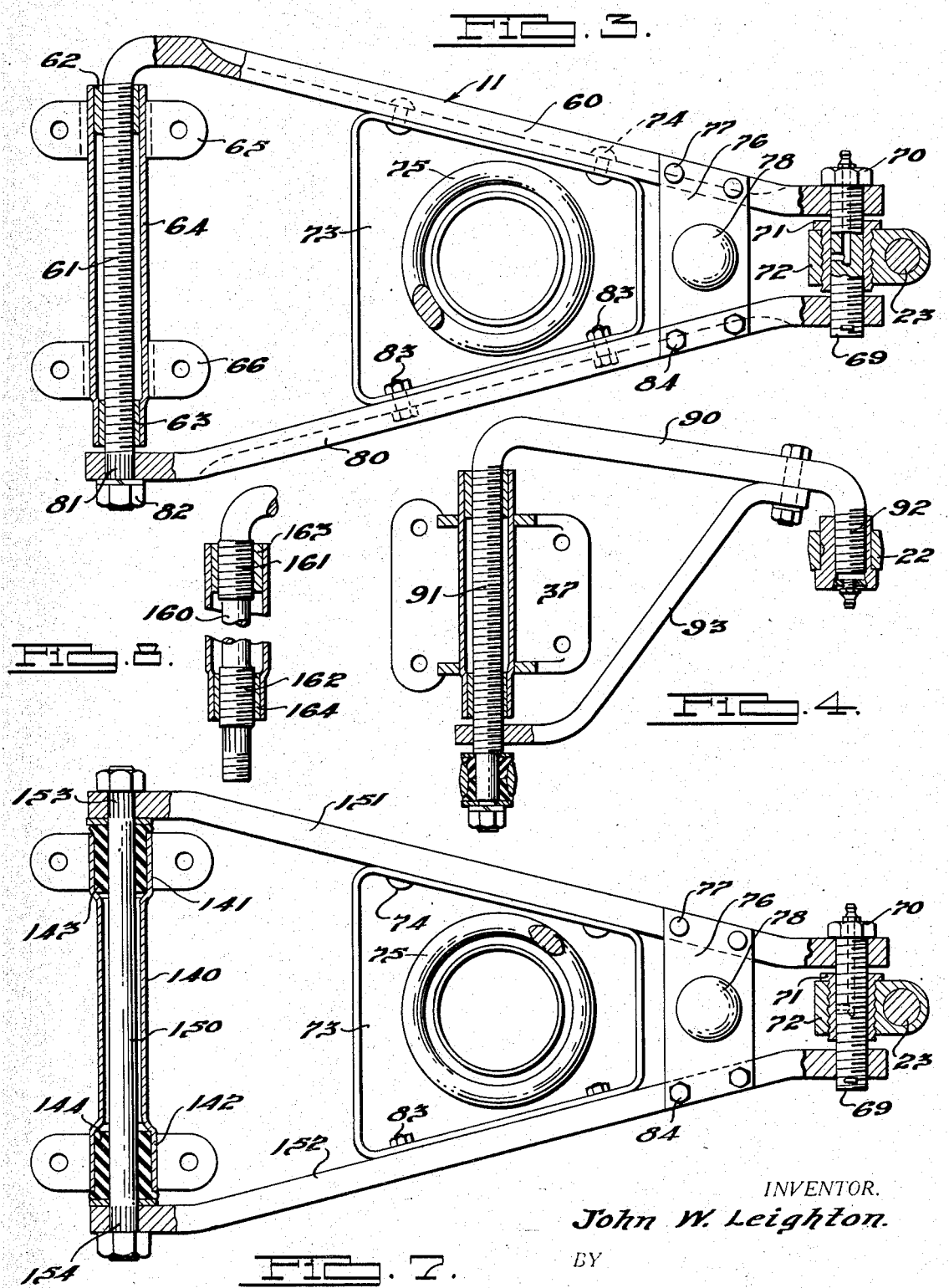

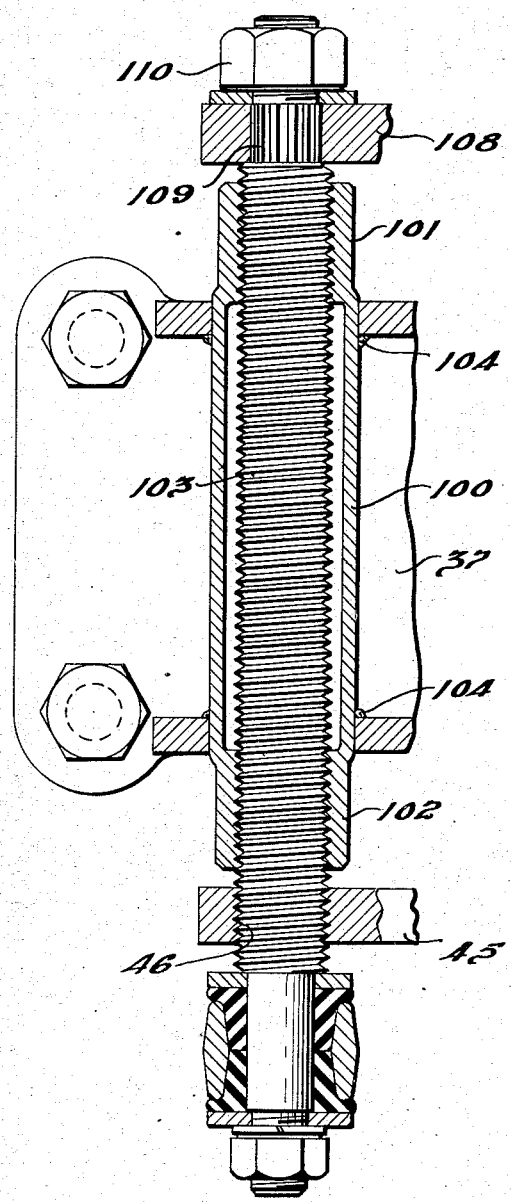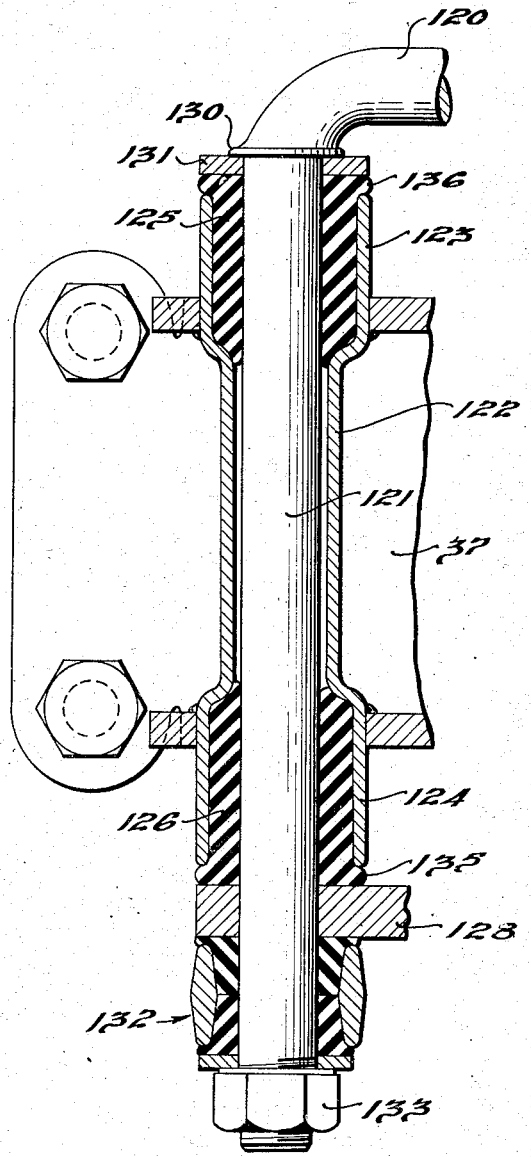

2,121,806

UNITED STATES PATENT OFFICE 2,121,806

INDEPENDENT WHEEL SUSPENSION

John W. Leighton, Port Huron, Mich.

Application March 20, 1936, Serial No. 69,786

14 Claims. (Cl. 267—20)

This invention relates primarily to independent wheel suspensions of the type wherein a pair of transversely extending arms are pivoted at their inner ends on longitudinal axes to the frame of the vehicle and carry at their outer ends an axle supporting member upon which may be mounted an axle and wheel.

One object of the invention is to improve the connecting arm structure of such an independent wheel suspension in order to provide an inexpensive arm structure of light weight and high strength.

Another object of the invention is to provide an improved pivotal support for the arms of an independent wheel suspension, which support is designed to facilitate assembly of the suspension structure on a vehicle.

Another object of the invention is to provide a pivotal supporting assembly comprising axially spaced threaded bearings adapted to cooperate with corresponding threads on a unitary journal, and a novel method of assembling such a pivotal supporting means.

It is a further object of the invention to provide a pivotal support comprising a pair of spaced bearings formed of rubber or similar elastic substance, and in which the bearings provide radial and axial support for a journal.

Another object of the invention is to provide an independent wheel suspension assembly formed of few parts which may be manufactured cheaply and may be readily installed on a vehicle.

Other objects and advantages of the invention will become apparent from the following specification, the accompanying drawings, and the appended claims.

Referring to the drawings wherein like numerals are applied to like parts in the several views, Figure 1 shows a fragmentary front elevation of a portion of an automobile frame, showing one front wheel and the preferred form of the independent wheel suspension;

Figure 2 is a section taken on the line 2—2 of Fig. 1 showing the upper arm of the independent wheel suspension;

Figure 3 is an elevation, partly in section, of the lower arm of the independent wheel suspension shown in Fig. 1;

Figure 4 shows a modified form of the upper arm;

Figures 5 and 6 show modified forms of the pivotal connection between the vehicle frame and the upper arm;

Figure 7 shows a modified form of lower arm structure and a modified pivotal connection between the frame and the lower arm;

Figure 8 shows a further modification of the pivotal connection between the frame and the lower arm;

As shown best in Figure 1, the independent wheel suspension is of the type in which is provided an upper arm 10 and a lower arm 11 pivotally connected at their inner ends to a transverse front frame member 12 of an automobile body and pivotally connected at their outer ends to an axle supporting member, indicated generally at 13. The axle supporting structure may be of any desired construction but is preferably of the type shown in applicant's co-pending application, Serial No. 59,808, filed January 20, 1936. In any event, the axes of the pivotal connections between the axle supporting member 13 and the arms 10 and 11 are parallel to the axes of the connections between the frame 12 and the arms 10 and 11, with the result that the wheel may move vertically with respect to the frame but cannot move laterally or longitudinally with respect thereto.

As best shown in Figure 2, the upper arm 10 is formed of a substantially Z-shaped element 18 which is provided with a rearwardly extending outer threaded extremity 20, journaled in an eccentric threaded bearing sleeve 21. The bearing sleeve 21 is rotatably carried by an eye 22 on the upper end of the non-rotatable axle supporting element 23. The eye 22 is split and is provided with upstanding ears through which a drawing up bolt 25 is inserted for tightening the eye about the bearing sleeve 21, all as more fully disclosed in applicant's co-pending application, Serial No. 733,487, filed July 2, 1934. It will be noted that where it is desired to adjust the camber of the wheel, bolt 25 may be loosened and the bearing sleeve 21 rotated within the eye 22. By reason of the fact that the exterior of the bearing sleeve 21 is eccentric with respect to its interior threaded bearing surface, rotation of the sleeve will effect a lateral adjustment between the arm 10 and the upper end of the non-rotatable axle supporting element 23, thereby effecting camber adjustment.

The inner end of the Z-shaped arm element 18 has an elongated forwardly extending threaded portion 30 pivotally secured to the frame member 12 by means of axially spaced threaded bearing sleeves 31 and 32, which have a press fit within the ends of a tubular member 33. The sleeve 32 is of smaller outside diameter than the sleeve 31 and the forward end of tube 33, adjacent sleeve 32, is correspondingly reduced for a purpose to be described. The tubular member extends through aligned openings in upstanding ears 35 and 36 on a bracket member 37, which is bolted at 38 to the upper face of the frame member 12, and may be welded at 40 to the upstanding ears when the device is assembled to prevent any relative movement between the tubular member and the bracket. This bearing assembly, comprising the tubular member 33 and the spaced bearing sleeves 31 and 32, constitutes a unitary pivotal connection for the arms, embodying axially spaced threaded bearings, the tubular member serving to encase the entire unit and to maintain the bearing sleeves in accurate alignment. Moreover, the arrangement described above is of particular advantage in that it facilitates assembly of the device as hereinafter set forth.

While the bearings 31, 32 and 33 may be assembled on the journal 30 in various ways, it is preferred to first thread the bearing sleeves 31 and 32 upon the threaded journal 30 into their final position, as shown, whereupon the extremity of the journal 30 is inserted into the larger or upper end of the tube 33, as viewed in Fig. 2, and advanced downwardly therein. During such movement of the journal and lower bearing sleeve into the tube, the lower sleeve 32 will move freely through the enlarged upper portion of the tubular member 33 until it reaches the restricted portion 34, at which time the upper sleeve 31 will have just reached the upper end of the tubular member 33. Thereupon, increased force is applied to the arm element 18 and the journal with the two bearing sleeves 31 and 32 upon it is forced further into the tubular member, the parts being so designed that a press fit is secured between the sleeves 31 and 32 and the extremities of the tubular member. It is only necessary then to insert the tubular member through the openings in bracket 37 to install the arm assembly on the vehicle.

Following the insertion of the tubular member 33 through the openings in the upstanding ears 35 and 36 of bracket 37, a reinforcing bar 45, having a threaded opening 46, is threaded on the projecting extremity of the journal 30 to a position slightly spaced from the end of the tubular member 33. The opposite end of the reinforcing bar 45 is then bolted to the arm element 18 at the outer reverse bend therein by means of a bolt 47. At the same time, a stop bracket 48 is secured to the arm element 18 by means of the bolt 47, which bracket is adapted to engage a resilient pad 50 on the extremity of the vehicle frame member 12 to limit downward movement of the arm 10 with respect to the frame. It will be observed that the bar 45 reinforces the angle of the Z-bar 18 which is subject to the greatest stress, that is, the angle adjacent the inner or forwardly extending journal 30, and hence that the arm structure will be of great strength and at the same time relatively inexpensive to manufacture by reason of the fact that it is formed of only two principal parts.

If desired, the extremity of the forwardly extending journal 30 may be reduced as at 50 to receive the eye 51 of a plunger type shock absorber, a fragment of which is shown in Figure 1 at 52. The lower end of the shock absorber may be pivotally connected in any suitable manner to the lower link 11 intermediate its ends. A pair of rubber sleeves 54 and 55 are positioned between the eye 52 and the reduced portion 50 of the journal and the rubber sleeves are compressed axially between a pair of washers 56 and 57 by means of a nut 58 to effect a tight connection between the shock absorber and the journal portion 50.

The lower arm structure for the independent wheel suspension shown in Figure 1 is preferably formed in the manner shown in Figure 3. As there shown, the lower arm includes an L-shaped bar 60 having a forwardly extending integral threaded journal portion 61 which is carried by a pair of spaced threaded bearing sleeves 62 and 63 mounted within a tubular member 64 in the manner described with respect to Figure 2. The tubular member 60 is secured to the under side of the frame member 21 by means of a pair of spaced U-brackets 65 and 66, which are bolted to the frame member 12 by means of bolts 67, and the tubular member is welded to the brackets to prevent relative movement therebetween.

The outer end of the arm element 60 is threaded on a threaded journal 69 and a nut 70 is drawn tightly against the arm 60 to lock it against rotation with respect to the journal. The journal 69 is carried by a bearing sleeve 71, which is secured by a shallow self-locking thread to a bracket 72 on the lower end of the non-rotatable axle supporting element 23, in the manner disclosed in applicant's co-pending application, Serial No. 59,808, filed January 20, 1936. A plate 73 is riveted at 74 to the arm element 60 and is adapted to receive the lower end of the vehicle spring 75, shown best in Figure 1, and a plate 76 is riveted to arm element 60 at 77. The plate 76 supports a rubber cushion 78 which is adapted to engage a pad 79 on the underside of the extremity of frame member 12 to limit upward movement of the arm 11 with respect to the frame.

When the bearing structure 62, 63 and 64 is assembled on the journal 61, a reinforcing bar 80 is threaded on the forward extremity of the threaded journal 69 and is forced on to a knurled portion 81 adjacent the extremity of journal 61 by means of a nut 82. The parts are so arranged that when the reinforcing bar 80 is forced on to the knurled portion 81 of the journal relative rotation between the parts is prevented. When the reinforcing bar is secured in position on the journals 61 and 69, it is bolted at 83 to the spring supporting plate 73 and at 84 to the plate 76 to additionally support the plates and strengthen the arm.

In Figure 4 is shown a modified form of the upper arm wherein the arm element 90 is given a substantial U-shape with forwardly extending threaded extremities 91 and 92, which cooperate with the bearings on the frame and the wheel supporting member in the manner described with respect to the structure shown in Figure 2. In this modification, a slightly different form of reinforcing bar 93 is utilized, inasmuch as a greater offset between the ends of the reinforcing bar is required. The structure shown in this figure, however, in all other respects is similar to that shown in Figure 2.

In Figure 5 is shown a modified form of the oscillating or pivotal connection between the upper arm and the frame member. In this construction, the tubular member is made of a casting 100, with reduced end portions 101 and 102 which are internally threaded to receive the journal 103 of the upper arm. In this construction, like that previously described, the tubular member 100 is welded at 104 to the bracket member 37.

The journal 103, shown in Figure 5, may correspond to the integral journals 30 or 91 on the one-piece arm elements 18 or 90 shown in Figures 2 and 4, respectively, but as shown in this figure, an alternative construction may be utilized, wherein the arm element is formed of a separate element 108, which is forced on a knurled portion 109 adjacent the extremity of the journal 103, by means of a nut 110, in the manner described with respect to the connection between journal 61 and reinforcing bar 80 in Figure 3.

Figure 6 shows a further modification of the pivotal bearing between the upper arm and the reinforcing frame. In this form the arm element 120 is provided with an integral forwardly extending journal 121 which is not threaded. A tubular member 122 surrounds the forwardly extending journal 121 and is provided with enlarged end portions 123 and 124 adapted to receive soft solid rubber bearing sleeves 125 and 126 which project beyond the ends of the tube. The reinforcing bar 128, which is similar to the bars shown in Figure 2 or 4, is freely journaled on the extremity of the forwardly extending portion 121 of the arm element. The journal 121 of the arm is provided at its rearward end with a shoulder 130 which is adapted to engage a washer 131 of approximately the same diameter as the outside diameter of the enlarged end section 123 of the tube 122. The shock absorber connection, indicated generally at 132, which is of the type described in connection with Fig. 2, is placed on the forward extremity of the journal 121 and is forced by means of a nut 133 into tight engagement with the reinforcing bar 128. This applies an axial force through the bar 128 to the extremity of the rubber sleeve 126 compressing it tightly within the space between the enlarged portion 124 of the tube and the journal 121 of the arm to provide a tight connection between the two and at the same time extrude the projecting end of the rubber sleeve outwardly beyond the end of the tube at 135 to form a resilient abutment against rearward axial thrust on the journal 121. When the nut 133 is tightened the reactive force is applied through the rod 121, shoulder 130 and washer 131 to the projecting end of the opposite sleeve 125 compressing that sleeve tightly within the space between the tube and the rod and extruding the projecting end of this sleeve outwardly beyond the end of the rod at 136 to provide a resilient, axial thrust abutment against movement in the opposite direction. In this form of the bearing the parts are so designed that no sliding movement occurs between the engaging surfaces on the sleeve and the journal 121 or the tubular member 122 and hence the limited turning movement of rod 121 within the sleeve is accompanied by a distortion of the rubber sleeve without any sliding friction or wear. It is apparent that instead of making the journal 121 integral with arm 120 they may be made as separate parts and secured together as in Fig. 5.

Fig. 7 shows a modified form of the lower arm structure in which is utilized a rubber bearing assembly comprising a tubular member 140 having enlarged ends 141 and 142 within which are positioned soft, solid rubber sleeves 143 and 144, respectively, arranged in the manner described with respect to the rubber bearings shown in Fig. 6. In Fig. 7 the journal 150 is shown as a separate element from both link bars, the two bars 151 and 152 being forced on to knurled extremities 153 and 154 respectively on the journal 150. It is apparent, however, that this rubber bearing shown in Fig. 7 is adapted for use in connection with the lower arm construction of the type shown in Fig. 3 and that the arm shown in Fig. 7 may be used with the bearing structure shown in Fig. 3.

Fig. 8 shows a modified form of the bearing structure shown in Fig. 3. It differs from the structure shown in Fig. 3 only in the fact that the journal 160 is upset or enlarged adjacent its opposite ends at 161 and 162 and the enlarged or upset sections are threaded to fit within the threaded bearing sleeves 163 and 164. The intermediate portion of the journal 160 is not threaded in this construction. This modified form of the journal is of advantage in that it requires less machining and reduces the amount of threading required to secure the bearing sleeves in position on the journal. This is of some importance in connection with the lower arm for the reason that the bearing is of relatively great length.

It is apparent from the above that there has been provided in accordance with the present invention an exceedingly simple, inexpensive and readily assembled independent wheel suspension which at the same time is quite rugged. While several modifications of certain features of the invention are shown, it is apparent that other modifications may be indulged in within the spirit of the appended claims.

What is claimed is:

1. In an independent wheel suspension, a vehicle frame, an axle supporting member, parallel threaded bearings on said frame and member respectively, a unitary connecting arm element having threaded journals at its ends mounted in said bearings, respectively, and a reinforcing means connecting a portion of said arm element intermediate said bearings with a portion beyond one of the bearings.

2. In an independent wheel suspension, a vehicle frame, an axle supporting member, a unitary connecting bar having two oppositely directed reverse bends intermediate its ends and having its ends extending parallel and in opposite directions, said ends being formed into threaded journals journaled on said frame and member respectively, and a reinforcing means connected at one end to said bar at one of the bends therein and at the other end to the adjacent free end of the bar.

3. In an independent wheel suspension, a vehicle frame, an axle supporting member, a tubular member fixed to said frame, a rotatable threaded shaft extending through said tubular member, threaded bearings at the opposite ends of the tubular member within which said shaft is journaled, and means fixedly carried by said shaft for connecting the same to said supporting member, said means having a rotatable connection with said supporting member on an axis parallel to the axis of said tubular member.

4. In an independent wheel suspension, a vehicle frame, an axle supporting member, an arm pivoted at its ends on parallel axes to said frame and member respectively, said pivotal connection between the arm and frame comprising a tubular member fixed to the frame, a threaded journal member fixed to the arm and a pair of internally threaded bushings having a press fit in the respective ends of the tubular member and adapted to receive the threaded journal.

5. An oscillating connection comprising a member having a threaded journal, a pair of threaded bearing sleeves rotatably mounted on the threaded journal in spaced relation, and a tubular member having a press fit on said bearing sleeves.

6. An oscillating connection comprising a member having a threaded journal, a pair of threaded bearing sleeves rotatably mounted on said threaded journal in spaced relation, one of said sleeves having a larger outside diameter than the other, and a tubular member having a reduced end press fitted on the smaller sleeve and the other end press fitted on the larger sleeve.

7. An oscillating link connection comprising an integral bar having two oppositely directed reverse bends intermediate its ends, said ends extending in opposite directions parallel to each other and having journals formed thereon, and reinforcing means extending across one of the reverse bend loops.

8. In an independent wheel suspension, a vehicle frame, an axle supporting member, eye-members fixed respectively on said frame and member and having parallel axes, a unitary connecting arm element having its ends extending into and rotatable within said eye-members respectively for connecting the frame and member, and a reinforcing means connecting a portion of said arm element intermediate of said bearings with a portion beyond one of the bearings.

9. In an independent wheel suspension, a vehicle frame, an axle supporting member, a unitary connecting bar having two oppositely directed reverse bends intermediate its ends and having its ends extending parallel and in opposite directions and pivotally connected to said frame and member respectively, and a reinforcing means connected at one end to said bar at one of the bends therein and at the other end to the bar at the free end adjacent the frame.

10. An oscillating link connection comprising an integral bar having its ends bent into parallelism, said ends having journals formed thereon, and reinforcing means extending between one end of the bar and an intermediate portion thereof.

11. In an independent wheel suspension, a vehicle frame, an axle supporting member, a unitary connecting bar having its ends bent into parallelism and extending in the same direction, said ends being rotatably mounted respectively in eye members carried respectively by the frame and the axle supporting member, and a reinforcing means connected at one end to an intermediate portion of said bar and at the other end to the bar at the free end adjacent the frame.

12. An oscillating link connection comprising an integral bar having its ends bent into parallelism extending in the same direction, said ends having journals formed thereon, and reinforcing means extending between one end of the bar and an intermediate portion thereof.

13. In an independent wheel suspension, a vehicle frame, an axle supporting member, a unitary connecting bar having its ends bent into parallelism, said ends being provided with threaded journals, threaded bearing members on said frame and axle supporting member in which said journals are received respectively, and a reinforcing element having a threaded bearing connection with said frame on the axis of said frame bearing member and being connected to said bar at a point thereon between said bearing members.

14. In an independent wheel suspension, a vehicle frame, an axle supporting member, a unitary bar pivotally connected at one end on said frame and having a threaded journal formed on its opposite end, said threaded journal having its axis parallel to the axis of said pivotal connection, a threaded bearing on said axle supporting member and journaled on said threaded journal, and a reinforcing element pivotally secured to said frame on the axis of said first mentioned pivotal connection and secured to said bar at a point thereon between said threaded bearing and the pivotal connection of the bar with the frame.

JOHN W. LEIGHTON.